United States Patent
Otto et al.

(10) Patent No.: US 9,421,746 B2
(45) Date of Patent: Aug. 23, 2016

(54) METHOD AND APPARATUS FOR JOINING PARTS TO BE JOINED WHICH ARE SUBJECT TO TOLERANCE

(71) Applicant: Airbus Operations GmbH, Hamburg (DE)

(72) Inventors: Hans Otto, Rain am Lech (DE); Rainer Schildt, Oederquart (DE)

(73) Assignee: Airbus Operations GmbH, Hamburg (DE)

( * ) Notice: Subject to any disclaimer, the term of this patent is extended or adjusted under 35 U.S.C. 154(b) by 249 days.

(21) Appl. No.: 13/845,769

(22) Filed: Mar. 18, 2013

(65) Prior Publication Data

US 2013/0266770 A1 Oct. 10, 2013

Related U.S. Application Data

(60) Provisional application No. 61/620,457, filed on Apr. 5, 2012.

(30) Foreign Application Priority Data

Apr. 5, 2012 (DE) .......................... 10 2012 205 633

(51) Int. Cl.
*B32B 37/12* (2006.01)
*C09J 7/02* (2006.01)
(Continued)

(52) U.S. Cl.
CPC ........... *B32B 37/1284* (2013.01); *B64C 1/069* (2013.01); *B64F 5/0009* (2013.01); *C09J 5/00* (2013.01); *C09J 7/02* (2013.01);
(Continued)

(58) Field of Classification Search
CPC .................. Y10T 428/24612; B32B 3/30
USPC ..................................... 428/172, 47
See application file for complete search history.

(56) References Cited

U.S. PATENT DOCUMENTS

| 5,554,429 A | * | 9/1996 | Iwata | ..... B27N 3/005 428/105 |
| 2009/0053406 A1 | * | 2/2009 | Ackerman | ..... B29C 73/10 427/142 |

(Continued)

FOREIGN PATENT DOCUMENTS

| DE | 102010010685 | 2/2011 |
| WO | 2010014333 | 2/2010 |

OTHER PUBLICATIONS

German Search Report, Mar. 4, 2013.

*Primary Examiner* — Brent O'Hern
(74) *Attorney, Agent, or Firm* — Greer, Burns & Crain Ltd.

(57) ABSTRACT

A method for joining parts to be joined which are subject to tolerance in the aerospace sector. The method involves determining the geometric data of a first and second part to be joined, determining the joining gap dimensions of the first and second parts from the determined geometric data and arranging a plurality of shape elements which can be connected together in planar manner in a first region of a surface of the first part. The method moreover comprises application of a first adhesive layer onto the plurality of shape elements and in a second region of the surface of the first part. The method finally involves joining the first and second parts, the first adhesive layer being brought into contact with the surface of the second part. A corresponding apparatus is provided for joining parts which are subject to tolerance in the aerospace sector.

9 Claims, 4 Drawing Sheets

(51) Int. Cl.
*C09J 5/00* (2006.01)
*F16B 11/00* (2006.01)
*B64C 1/06* (2006.01)
*B64F 5/00* (2006.01)
B64C 1/10 (2006.01)
B64C 1/00 (2006.01)

(52) U.S. Cl.
CPC .............. *F16B 11/006* (2013.01); *B64C 1/10* (2013.01); *B64C 2001/0072* (2013.01); *Y02T 50/433* (2013.01); *Y10T 428/24612* (2015.01); *Y10T 428/24628* (2015.01); *Y10T 428/24752* (2015.01)

(56) References Cited

U.S. PATENT DOCUMENTS

2009/0154775 A1* 6/2009 Lea ........................ G01B 11/14
 382/108
2012/0183716 A1* 7/2012 Jordan .................. B29C 70/088
 428/47

\* cited by examiner

METHOD AND APPARATUS FOR JOINING PARTS TO BE JOINED WHICH ARE SUBJECT TO TOLERANCE

CROSS-REFERENCES TO RELATED APPLICATIONS

This application claims the benefit of the U.S. Provisional Application No. 61/620,457, filed Apr. 5, 2012, and of the German patent application No. 10 2012 205 633.5, filed Apr. 5, 2012, the entire disclosures of which are both incorporated herein by way of reference.

BACKGROUND OF THE INVENTION

The present invention relates to a method and an apparatus for joining parts to be joined which are subject to tolerance in the aerospace sector.

Modern lightweight construction methods have greatly changed the aerospace sector in the recent past. The use of suitable materials has accordingly led to improvements in terms of weight, safety and comfort, while simultaneously enabling cost savings. In addition to the use of suitable materials, this progress has been achieved by intelligent use of modern adhesives technology, it being possible to combine adhesives technology with conventional joining techniques such as riveting, screw fastening or spot welding.

The fuselage of large aircraft is substantially joined together manually using a semi-monocoque construction method. Using apparatuses of an appropriate size, the fuselage of an aircraft is fitted in partially mechanized and in part in manual assembly steps with stringers, frame elements, passenger and cargo decks, door and window frames, before the skin is completed.

Structurally significant connections are made by riveting or by a combination of riveting and adhesive bonding, the latter also being known as rivet bonding. In this method, both panel and fuselage segments and the introduced components are connected together by riveting, with shim materials being applied prior to joining which fill the slightly uneven gap between the parts to be joined which is left by riveting.

With regard to shim materials, a distinction is drawn between liquid shims and solid shims. Liquid shims generally comprise two-component epoxy resins, which have a gap-filling capacity of approximately 1 mm and a curing time of nine hours at room temperature.

DE 10 2010 010 685 A1 discloses a method for applying adhesive in vehicle construction when joining parts to be joined which are subject to tolerance, characterized by automated determination of the geometric data of the parts to be joined, determination of the joining gap dimensions of the parts to be joined from the determined geometric data, joining of the parts to be joined in their joining position, and application of the adhesive in the joint gap during or after joining of the parts to be joined.

Relatively large gaps from 1-2 mm in size are generally compensated manually by means of solid shims made from fiber composite material. A combination of liquid and solid shim materials may also be used.

There are various kinds of solid shims. On the one hand, solid shims may be made from a sheet material consisting of metal or fiber composite materials. The sheets are of different thicknesses, from which the shims are cut with the contour of the gap to be closed.

Shims in sheet form may moreover already have the subsequent contour and be made in different thicknesses. On the other hand, solid shims may take the form of adhesively bonded layers which are individually peelable for adjusting thickness.

There are moreover shaped shims which are preshaped with a mould into the curved shape which fits the gap to be closed. Depending on the particular gap profile, there are various methods by which the above-described solid shims may be introduced into the gap.

In the case of gaps with a straight or parallel profile, the gap can be filled in with sheet material which has been cut to size. The thickness of the sheet is here determined from the gap which arises, and the shape from the joint face. To this end, the shim is cut or sawn in the appropriate thickness for the surface from a large, previously manufactured sheet which is held in stock in various thicknesses.

The contour of the solid shims may moreover already be conformed to the parts to be joined and held in stock in various thicknesses. This saves the step of cutting to size before the joining process, since all that remains to be done is to insert the appropriate shim for the location to be closed in the thickness to be used for the assembly gap. Such a gap profile may also be filled with adhesively bonded layers in which the thickness may be established by peeling off individual layers.

In the case of gaps with a wedge-shaped profile, the sheet material, irrespective of whether the contour is cut from a sheet or is already held in stock with the correct contour, must additionally be ground to the correct wedge shape. In the case of adhesively bonded layers, instead of being ground, the individual layers may be removed in steps in order to obtain the correct wedge shape.

If, in addition to the above-described wedge shape, the part to be joined has a three-dimensional shape, the sheets must additionally be cut to size in such a manner that they can conform in the correct thickness to the shape of the part to be joined. In addition, the wedge shape must be achieved either by grinding or by very fine subdivision into numerous sheets of different thicknesses. Adhesively bonded layers must also be cut to size in such a manner that they can individually conform to the contour without individual layers becoming detached as a result of buckling due to excessive curvature. Again, the wedge shape may be achieved by stepped removal.

A further possibility for reproducing the curved shape is to produce a shim with the correct shape specifically for a possible gap. A mould which has the shape of the subsequent gap is required for this purpose. The shim to be inserted may then be produced in this mould. The shim need only then be adapted to the ultimate shape of the gap, specifically by being ground to the wedge shape.

As described above, filling gaps of curved and wedge-shaped profile with a solid shim can only be achieved with very great difficulty, this being the most problematic application. However, since this is specified from a certain gap dimension, the effort must be made if the components are to be assembled. This effort may take two different forms, depending on which of the above-described methods is used.

If sheet material is fitted into the gap, cutting the sheets to size and grinding them involve considerable individual effort, as these tasks have to be performed anew for each gap. If the curved shape of the gap is filled by a shim which has already previously been produced in a specific apparatus and then held in stock, this entails very considerable logistical effort, high warehousing costs and additional manual labor due to the final adaptation to the wedge shape.

SUMMARY OF THE INVENTION

Against this background, it is an idea of the present invention to provide an improved method and an apparatus for joining parts to be joined which are subject to tolerance, which method and apparatus reduce both assembly and logistical effort.

The invention provides a method for joining parts to be joined which are subject to tolerance in the aerospace sector. The method comprises determining the geometric data of a first and second part to be joined and determining the joining gap dimensions of the first and second parts to be joined from the determined geometric data. The method moreover comprises arranging a plurality of shape elements or shims which can be connected together in planar manner in a first region of a surface of the first part to be joined, and applying a first adhesive layer onto the plurality of shape elements and in a second region of the surface of the first part to be joined. The method further comprises joining the first and second parts to be joined, the first adhesive layer being brought into contact with the surface of the second part to be joined. In this manner, the joint gap may be filled with standard shape elements. These shape elements are laid adjacent one another and, due to their shape, result in an almost continuous surface. This reduces logistical effort, since it is no longer necessary for a plurality of different shims to be held in stock.

It is preferably provided that, prior to arranging the shape elements, a second adhesive layer is applied onto the surface of the first part to be joined, the shape elements being fixed by the second adhesive layer to the surface of the first part to be joined. The shape elements may thus be positioned in the desired location and fixed by the adhesive layer.

A further preferred exemplary embodiment provides that, prior to arranging the shape elements on the surface of the first part to be joined, a third adhesive layer is applied onto a surface of the shape elements which faces the first part to be joined. By applying the adhesive layer onto a surface of the shape elements which faces the first part to be joined, the respective shape elements may likewise be positioned and fixed exactly in the desired position on the first part to be joined.

An advantageous further development of the invention provides that the plurality of shape elements are connected such that an arrangement of the plurality of shape elements forms a curved surface which conforms to a curvature of a joint gap. By providing the plurality of shape elements which are joined together and are connected in such a way as to permit a curvature of the surface of the arrangement of the plurality of shape elements, the latter are capable of conforming to the curvature of the joint gap.

It is preferably provided that a plurality of shape elements of different thicknesses are arranged such that an arrangement of the plurality of shape elements forms a wedge-shaped surface which conforms to a wedge shape of the joint gap. This avoids the effort involved in cutting to size and grinding the shape elements. In addition, when fiber composite materials are used as the shape element, exposure to harmful substances and the additional cost of extraction equipment are also avoided.

An advantageous further development of the invention provides that first shape elements which have a first shape are arranged in a central region of the joint gap and second shape elements which have a second shape are arranged in a peripheral region of the joint gap. A suitable shape element may thus be provided for each position on the surface of the part to be joined. The additional processing effort involved in cutting to size is eliminated.

It is preferably provided that the shape elements are constructed for arrangement by machine on the surface of the first part to be joined. The effort involved in and time taken for assembly may be reduced as a consequence.

The invention moreover provides an apparatus for joining parts to be joined which are subject to tolerance in the aerospace sector. The apparatus comprises a plurality of shape elements which can be connected together in planar manner and are arranged in a first region of a surface of a first part to be joined. The apparatus moreover comprises a first adhesive layer which is applied onto the plurality of shape elements and in a second region of the surface of the first part to be joined, such that the first adhesive layer is in contact with the surface of the second part to be joined. In this manner, the joint gap may be filled with standard shape elements. These shape elements or shims are arranged adjacent one another and, due to their shape, result in an almost continuous surface. This reduces logistical effort, since it is not necessary for a plurality of different shims to be held in stock.

It is preferably provided that a second adhesive layer is formed on the surface of the first part to be joined, the shape elements being fixable by the second adhesive layer to the surface of the first part to be joined. The shape elements may thus be positioned in the desired location and fixed by the adhesive layer.

A further preferred exemplary embodiment provides that a third adhesive layer is formed on a surface of the shape elements which faces the first part to be joined. By forming the adhesive layer on a surface of the shape elements which faces the first part to be joined, the respective shape elements may likewise be positioned and fixed exactly in the desired position on the first part to be joined.

It is advantageously provided that the shape element is variable in size and/or thickness. In this manner, the shape elements can be conformed optimally to the joint gap.

An advantageous further development of the invention provides that the plurality of shape elements are connected such that an arrangement of the plurality of shape elements forms a curved surface which is conformed to a curvature of a joint gap. By providing the plurality of shape elements which are joined together and are connected in such a way as to permit a curvature of the surface of the arrangement of the plurality of shape elements, the latter are capable of conforming to the curvature of the joint gap.

It is preferably provided that a plurality of shape elements of different thicknesses are arranged such that an arrangement of the plurality of shape elements forms a wedge-shaped surface which conforms to a wedge shape of the joint gap. This avoids the effort involved in cutting to size and grinding the shape elements. In addition, when fiber composite materials are used as the shim, exposure to harmful substances and the additional cost of extraction equipment are also avoided.

An advantageous further development of the invention provides that first shape elements which have a first shape are formed in a central region of the joint gap and second shape elements which have a second shape are formed in a peripheral region of the joint gap. A suitable shape element may thus be provided for each position on the surface of the part to be joined. The additional processing effort involved in cutting to size is eliminated.

It is advantageously provided that the shape element has a triangular, square or hexagonal shape. The shape elements may thus be laid adjacent one another to give rise to a surface of shape elements, a perfectly fitting arrangement of the shape elements being enabled.

BRIEF DESCRIPTION OF THE DRAWINGS

Exemplary embodiments of the invention are explained in greater detail in the following description and illustrated in the drawings, in which.

In the figures similar or functionally identical elements are labelled with the same reference signs.

DETAILED DESCRIPTION OF THE PREFERRED EMBODIMENTS

Figure 1:
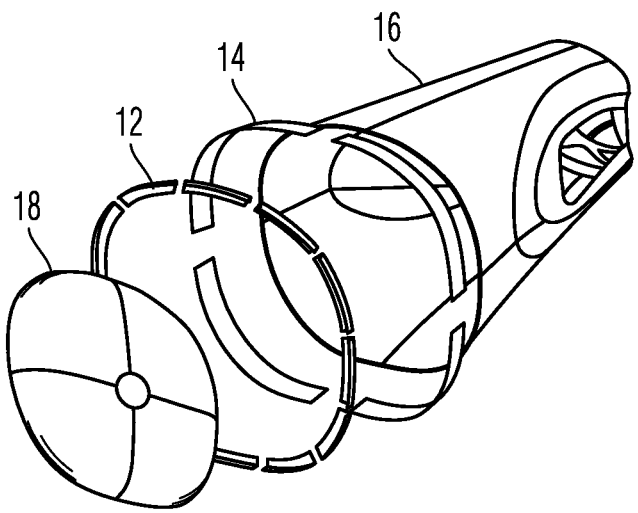
FIG. 1 shows an exemplary arrangement of fuselage segments of an air- or spacecraft.

FIG. 1 shows a schematic view of a known arrangement of fuselage segments of an air- or spacecraft. An L chord or first part to be joined 12 and a butt strap or second part to be joined 14 are provided for connecting a skin 16 of the air- or spacecraft to a pressure bulkhead 18. The pressure bulkhead 18 is secured using the first part to be joined 12, which is constructed as a multipart L-shaped annular frame and is fastened to the second part to be joined 14 and, via the second part to be joined 14, to the skin 16. The second part to be joined 14 forms the transition to subsequent fuselage segments (not shown), such as for example a left-hand and right-hand side shell and an upper and lower shell. When applying the first part to be joined 12 to the second part to be joined 14 and to the skin 16, spherically curved joint gaps with a wedge-shaped profile in two directions may arise.

Figure 2:
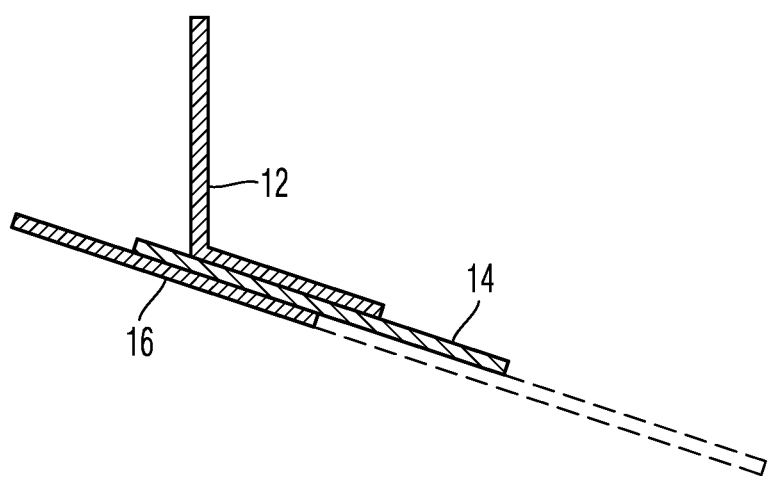
FIG. 2 shows a cross-sectional view of the exemplary arrangement of fuselage segments of an air- or spacecraft shown in FIG. 1.

FIG. 2 shows a cross-sectional view of the arrangement shown in FIG. 1 of fuselage segments of an air- or spacecraft. The first part to be joined 12 is connected to the second part to be joined 14 and the second part to be joined 14 is connected to the skin 16. The first part to be joined 12 is L-shaped, a horizontal portion of the first part to be joined 12 being connected in planar manner to the second part to be joined 14. The joint gap, which is determined by manufacturing tolerances, is formed between the first and second parts to be joined 12, 14.

Figure 3A:
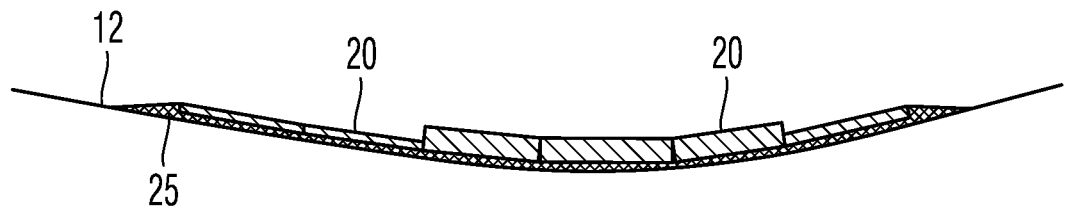
FIG. 3a shows a cross-sectional view of an apparatus according to the invention for joining parts to be joined in an air- or spacecraft according to a first exemplary embodiment.

FIG. 3a shows a cross-sectional view of an apparatus according to the invention for joining parts to be joined in an air- or spacecraft according to a first exemplary embodiment. The first part to be joined 12 shown in FIG. 3a exhibits a spherical curvature. A plurality of shape elements 20 connected together in planar manner are arranged on the first part to be joined 12.

An adhesive layer 25 is applied onto the surface of the first part to be joined 12, the shape elements 20 being fixed to the surface of the first part to be joined 12 by the adhesive layer 25. The shape elements 20 may, however, likewise be applied and fixed in any other manner to the surface of the first part to be joined 12.

A plurality of shape elements 20, which exhibit a greater thickness than the shape elements 20 arranged at the peripheral regions of the first part to be joined 12, are arranged in a central region of the first part to be joined 12.

Figure 3B:
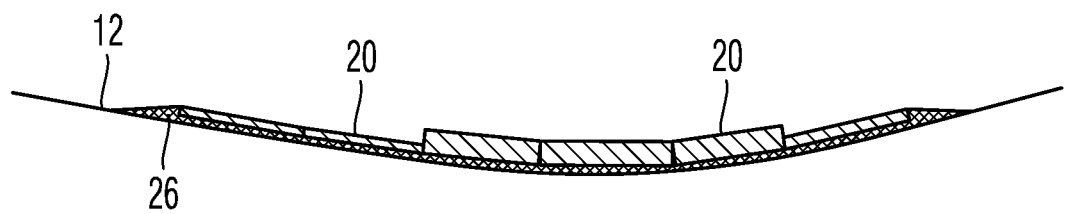
FIG. 3b shows a cross-sectional view of the apparatus according to the invention for joining parts to be joined in an air- or spacecraft according to a second exemplary embodiment.

FIG. 3b shows a cross-sectional view of the apparatus according to the invention for joining parts to be joined in an air- or spacecraft according to a second exemplary embodiment. The first part to be joined 12 exhibits a spherical curvature. A plurality of shape elements 20 connected together in planar manner are arranged on the first part to be joined 12. A third adhesive layer 26 is formed on a surface of the shape elements 20 which faces the first part to be joined, the shape elements 20 being fixed by the adhesive layer 26 to the surface of the first part to be joined 12. The shape elements 20 may, however, likewise be applied and fixed in any other manner to the surface of the first part to be joined 12. A plurality of shape elements 20, which exhibit a greater thickness than the shape elements 20 arranged at the peripheral regions of the first part to be joined 12, are arranged in a central region of the first part to be joined 12.

Figure 4:
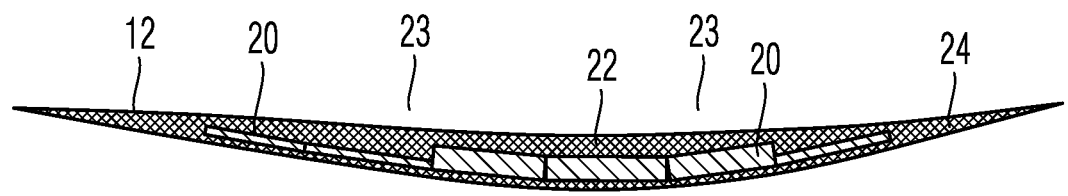
FIG. 4 shows a cross-sectional view of the apparatus according to the invention for joining parts to be joined in an air- or spacecraft.

FIG. 4 shows a cross-sectional view of the apparatus according to the invention for joining parts to be joined in an air- or spacecraft. The first part to be joined 12 exhibits a spherical curvature. A plurality of shape elements 20 which can be connected together in planar manner are arranged on the first part to be joined 12 in a first region 23 of a surface of the first part to be joined 12. Within the first region 23, a plurality of shape elements 20 have a different thickness relative to other shape elements 20. In other words, a plurality of shape elements 20, which are arranged in a central region of the first region 23, have a greater thickness than shape elements 20 arranged in a peripheral region of the first region 23. Moreover, a first adhesive layer 22 is applied onto the plurality of shape elements 20 wherein the plurality of shape elements are completely covered by said first adhesive layer such that a gap between said joining parts is filled and in a second region 24 of the surface of the first part to be joined 12. The second part to be joined 14, which is not shown in FIG. 4, is arranged opposite the first adhesive layer 22 and, after joining with the first part to be joined 12, is in contact with the first adhesive layer 22.

The maximum admissible liquid shim thickness is 1 mm. If the gap to be closed is, for example, 1.4 mm thick at the location to be closed, a solid shim must be embedded.

It is possible in this case, for example, to use a solid shim of a thickness of 0.6 mm, since it consequently reduces the liquid shim or the adhesive layer 22 to an admissible thickness of 0.8 mm, and in the process can make use of this 0.8 mm in order to embed the solid shim. A solid shim of a thickness of 0.7 mm or 0.5 mm may, however, also be used. The position of the shim may thus also vary, since no abrupt changes in the thickness of the gap are to be anticipated and thus the precise position is not of decisive importance when laying the solid shims.

According to the method for joining parts to be joined which are subject to tolerance 12, 14 in the aerospace sector, geometric data of a first and second part to be joined 12, 14 are determined and then the joining gap dimensions of the first and second parts to be joined 12, 14 are determined from the determined geometric data. The method furthermore comprises arranging a plurality of shape elements 20 which can be connected together in planar manner in a first region 23 of a surface of the first part to be joined 12 and applying a first adhesive layer 22 to the plurality of shape elements 20 and in a second region 24 of the surface of the first part to be joined 12.

Arranging the shape elements 20 on the first part to be joined 12 comprises pressing the shape elements 20 onto the first part to be joined 12. This may be performed manually or by machine. A clamping apparatus, which holds the shape elements 20 in the correct position and presses them down with a defined pressure, may be used for this purpose.

The method finally comprises joining the first and second parts to be joined 12, 14, the first adhesive layer 22 being brought into contact with the surface of the second part to be joined 14, and curing the adhesive layer 22.

Figure 5:
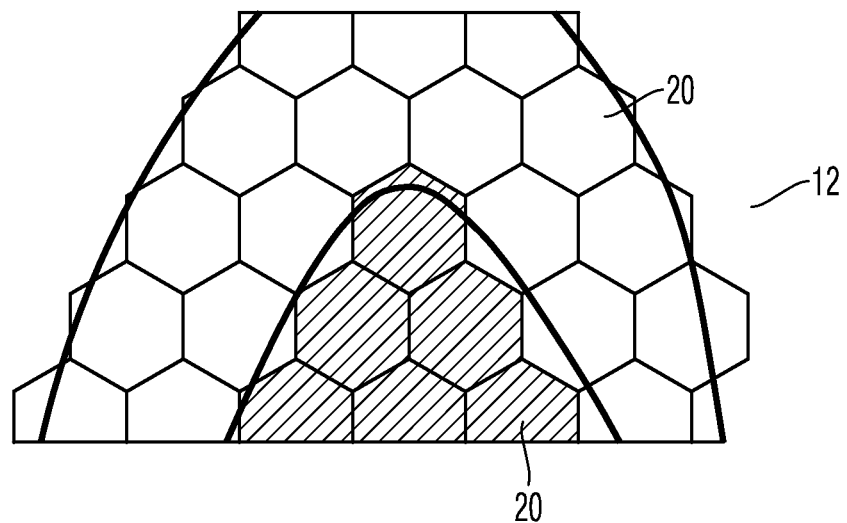
FIG. 5 shows a longitudinal sectional view of the apparatus according to the invention for joining parts to be joined in an air- or spacecraft according to the present invention.

FIG. 5 shows a longitudinal sectional view of the apparatus according to the invention for joining parts to be joined in an air- or spacecraft according to the present invention. Shape elements 20 of a predetermined thickness are arranged in a peripheral region of the first part to be joined 12 or of the joint gap. In a central region of the first part to be joined 12, on the other hand, uniform shape elements 20 are arranged which are of a different thickness relative to the shape elements 20 arranged in the peripheral region of the first part to be joined 12.

The procedure is here explained by way of example using hexagons as the standard shim. Other shapes (triangles, squares etc.) may, however, also be used. The shape is selected on the basis of the particular application.

The shapes may here either be specifically cut to size for a particular application (if for example a surface which has a constant edge length is to be covered, for example when inserting an annular frame) or a multipurpose size which makes sense for most applications may be defined. The size of the standard shapes may also be adapted to the curvature of the gap to be closed, since although it takes longer to insert smaller shapes, strongly curved surfaces may be covered better with them. Depending on requirements, the shape elements may be aligned in any desired orientation on the part to be joined.

The corners which arise at the edge of the surface of the shape elements 20 or the transitions from one standard shim thickness to another are not crucial, since the transitions in the gap are fluid. The best arrangement of the shims may here be decided as seen fit. All that is important is that the admissible liquid shim thickness is not exceeded and that sufficient space is nevertheless left in order to embed the standard shim in liquid shim.

In addition to the good possibilities for varying thickness, it is relatively easy slightly to modify the standard shims using a lever guillotine or to adapt them to specific positions and situations (for example corners in the peripheral region).

Various standard shims for different regions may likewise be produced in advance and kept in stock. It may, for example, make sense to produce standard shims for the peripheral region and standard shims for the middle of the surface of the shape elements 20.

Figure 6:
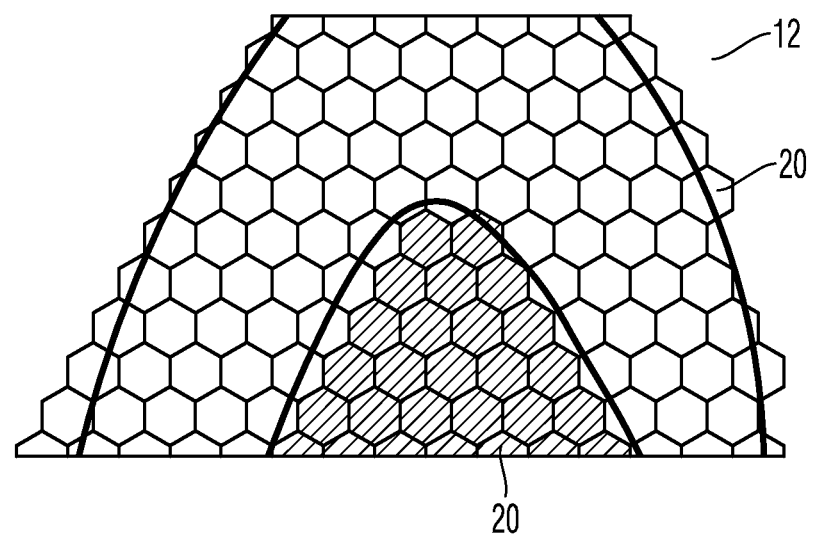
FIG. 6 shows a longitudinal sectional view of the apparatus according to the invention for joining parts to be joined in an air- or spacecraft according to the present invention.

FIG. 6 shows a longitudinal sectional view of the apparatus according to the invention for joining parts to be joined in an air- or spacecraft according to the present invention. As shown in FIG. 5, a plurality of shape elements 20 are arranged on the first part to be joined 12, the shape elements arranged in a peripheral region of the first part to be joined 12 exhibiting a different thickness to uniform shape elements arranged in a central region of the first part to be joined 12.

In addition, the shape elements 20 are of a different size to the shape elements 20 shown in FIG. 5. In comparison with the shape elements 20 shown in FIG. 5, the shape elements 20 shown in FIG. 6 are smaller in size. The shape elements 20, with their smaller dimensions, may consequently be better fitted to a curvature of the joint gap.

Figure 7:
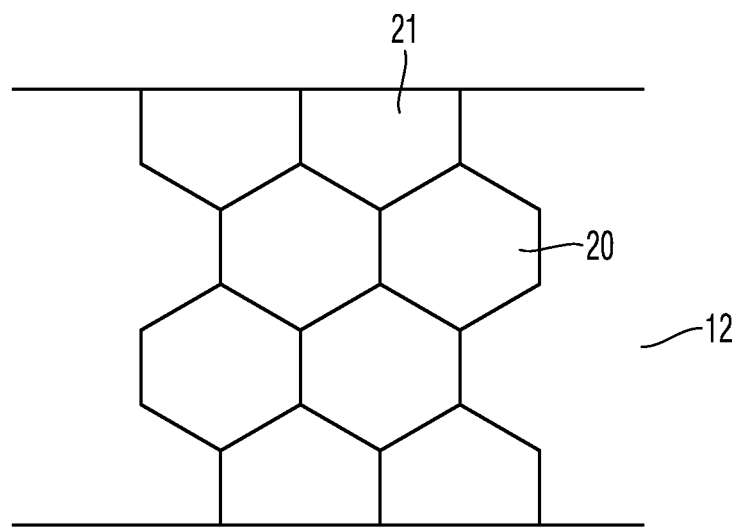
FIG. 7 shows a longitudinal sectional view of the apparatus according to the invention for joining parts to be joined in an air- or spacecraft according to the present invention.

FIG. 7 shows a longitudinal sectional view of the apparatus according to the invention for joining parts to be joined 12, 14 in an air- or spacecraft according to the present invention. In a central region, the first part to be joined 12 comprises first shape elements 20 which exhibit a first shape. Second shape elements 21 which exhibit a second shape are in each case arranged in a peripheral region of the first part to be joined or of the joint gap. The second shape of the second shape elements 21 is here adapted to the shape or the edge of the part to be joined 12. The shape elements 20, 21 may be formed, for example, from GRP, CFRP, aluminum, titanium or a similar material.

Although the present invention has been described in connection with various embodiments, it will be appreciated from the specification that various combinations of elements, variations or improvements therein may be made, and are within the scope of the invention.

The invention claimed is:

1. An apparatus for joining parts to be joined which are subject to tolerance in the aerospace sector, comprising:
   a plurality of uniform shape elements which are connected together in planar manner and which are arranged in a first region of a surface of a first part to be joined; and
   a first adhesive layer, which is applied onto the plurality of uniform shape elements and in a second region of the surface of the first part to be joined, such that the first adhesive layer is in contact with the surface of the second part to be joined, the first part to be joined being connected in planar manner to the second part to be joined, wherein the plurality of uniform shape elements are completely covered by said first adhesive layer such that a joint gap formed between the first and second parts to be joined is filled by means of the plurality of uniform shape elements arranged on the surface of the first part to be joined completely covered by the first adhesive layer.

2. The apparatus according to claim 1, wherein a second adhesive layer is formed on the surface of the first part to be joined, the plurality of uniform shape elements being fixable by the second adhesive layer to the surface of the first part to be joined.

3. The apparatus according to claim 1, wherein a third adhesive layer is formed on a surface of the plurality of uniform shape elements which faces the first part to be joined.

4. The apparatus according to claim 1, wherein the plurality of uniform shape elements are variable in size and/or thickness.

5. The apparatus according to claim 1, wherein the plurality of shape elements are connected such that an arrangement of the plurality of uniform shape elements forms a curved surface which conforms to a curvature of a joint gap.

6. The apparatus according to claim 1, wherein a plurality of first uniform shape elements which have a first shape are arranged in a central region of the joint gap and a plurality of second uniform shape elements which have a second shape are arranged in a peripheral region of the joint gap.

7. The apparatus according to claim 1, wherein the plurality of uniform shape elements may exhibit a triangular, square or hexagonal shape or a similar shape.

8. The apparatus according to claim 1, wherein a plurality of uniform shape elements of different thicknesses are arranged such that an arrangement of the plurality of uniform shape elements forms a wedge-shaped surface which conforms to a wedge shape of the joint gap.

9. An apparatus for joining parts to be joined which are subject to tolerance in the aerospace sector, comprising:
 a plurality of uniform shape elements which are connected together in planar manner and which are arranged in a first region of a surface of a first part to be joined; and
 a first adhesive layer, which is applied onto the plurality of uniform shape elements and in a second region of the surface of the first part to be joined, such that the first adhesive layer is in contact with the surface of the second part to be joined, wherein the plurality of uniform shape elements are completely covered by said first adhesive layer such that a gap between said joining parts is filled, wherein a plurality of uniform shape elements of different thicknesses are arranged such that an arrangement of the plurality of uniform shape elements forms a wedge-shaped surface which conforms to a wedge shape of the joint gap.

* * * * *